Figure 1:
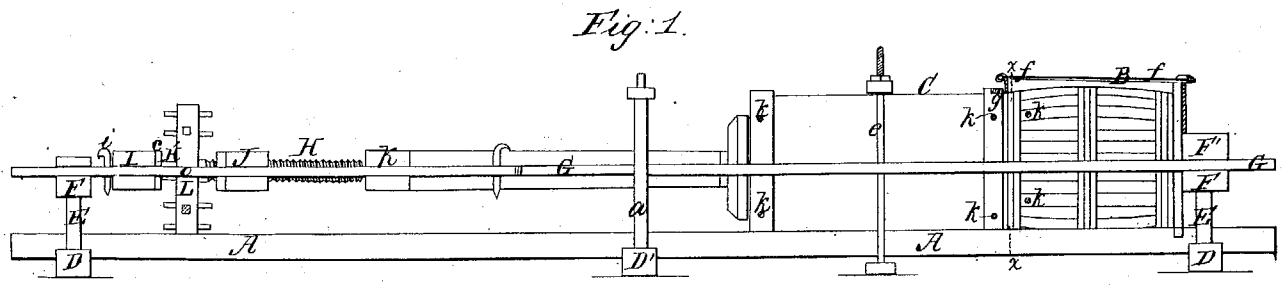

A. J. MURRAY.

TOBACCO PRESS.

No. 37. Reissued May 17, 1842.

THE NORRIS PETERS CO., PHOTO-LITHO., WASHINGTON, D. C.

UNITED STATES PATENT OFFICE.

ALEX. J. MURRAY, OF WEST RIVER, MARYLAND.

IMPROVEMENT IN PORTABLE PRESSES FOR PRESSING TOBACCO, COTTON, HAY, &c.

X8581½

Specification forming part of Letters Patent No. [illegible], dated January 9, 1835; Reissue No. 37, dated May 17, 1842.

*To all whom it may concern:*

Be it known that I, ALEXANDER J. MURRAY, formerly of Annapolis, but now of West River, in the county of Anne Arundel and State of Maryland, have invented a new and useful Improvement in the Manner of Constructing Portable Presses for Pressing Tobacco, Cotton, Hay, and other Articles; and I do hereby declare that the following is an amended specification of that upon which Letters Patent of the United States were granted to me for the said invention under date of the 9th day of January, 1835, which patent has been deemed inoperative from defects in the said specification, and which defects arose from inadvertence and mistake.

In my press the power is to be exerted horizontally, the frame-work consisting of pieces of timber twenty feet (more or less) in length placed in that position, and supported by vertical studs of two or three feet in length. I have in the accompanying drawings represented my machine as constructed for the pressing of tobacco, and will so describe it, although it may be applied to the pressing of other articles. When tobacco is to be pressed, one head of the hogshead which is to contain it being removed, it is to be hand-packed in the ordinary way until filled. The hogshead is to have two, four, or more holes bored through it near its open end for the purpose of receiving one, two, or more rods, which are to be passed through them to prevent the falling out of the tobacco when the hogshead is turned on its side, as it must be, for the purpose of placing it upon the press.

Besides filling the hogshead in the manner described, I also fill another receptacle, which I denominate a "false hogshead," that consists of a hollow cylinder the internal diameter of which is somewhat less than that of the hogshead into which the tobacco is to be packed. This cylinder is to be open at both ends, and it is to have holes bored through it near to each of its ends, in the same manner and for the same purpose with those near the open head of the hogshead—namely, to admit of the passing of rods through them to prevent the falling out of the tobacco with which it is to be filled. This false hogshead is to be placed vertically, and rods are to be passed through the holes at its lower end. It is then to be filled with tobacco in the same manner with the hogshead, and when so filled the tobacco is to be confined in place by the passing of rods through the holes in its upper end. The hogshead is then to be turned on its side and rolled onto the bed or cradle of the press, which is duly prepared to receive it in a manner to be presently described. The false hogshead is in like manner to be turned on its side and rolled onto the cradle or bed of the press, so as to have one of its ends to coincide with the open end of the hogshead.

It will be seen that in effecting the object of placing the hogshead and the false hogshead upon the press in a horizontal position while they are loosely filled with tobacco the use of the rods or of some equivalent device to retain it in place is essential. When the hogshead and false hogshead are thus situated, they are ready for the operation of the press, the construction of which I will now proceed to describe.

Figure 2:
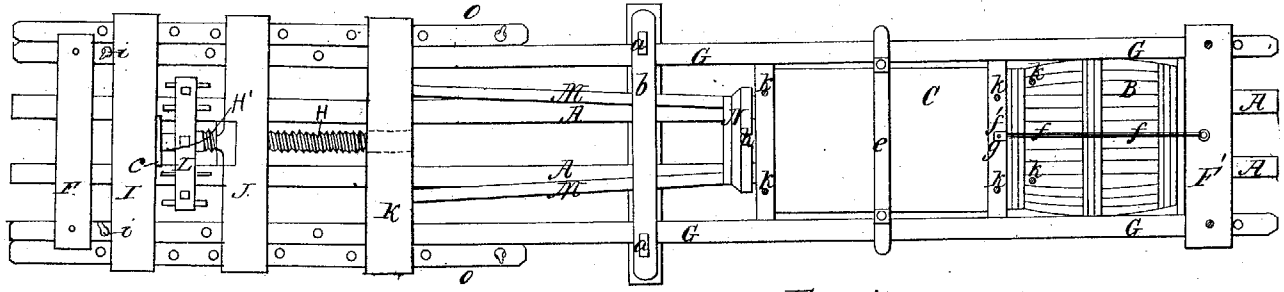

In the accompanying drawings, Figure 1 is a side view of my press with the hogshead and false hogshead thereon. Fig. 2 is a top view of the same, and Fig. 3 a cross-section thereof in the line *x x* of Fig. 1.

Figure 4:
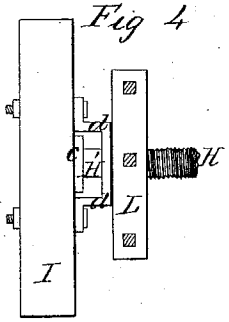

A A are two longitudinal timbers, which constitute the bed or cradle, upon which the hogshead B and the false hogshead C are to lie, and these rest upon cross-timbers or ground-sills D D, from which rise vertical studs E E, mortised into them and into the stationary head-blocks or end timbers, F F. These end timbers are connected together by side pieces G G, which pass through mortises or gains made in them, and they are secured together by pins or bolts. As these side pieces are to bear the strain by tension only, they do not require to be thicker than is necessary to keep them from springing, and I usually support them by a frame at the middle of the press, consisting of a sill, D′, two side pieces, *a a*, and a cap-piece, *b*. The pressing is to be effected by means of a short screw, H, which is placed horizontally, and has its head bearing against a sliding head-block, I, and its screw part passes through a female screw or nut in the sliding block or cross-timber J. I sometimes employ a third cross-timber or sliding block, K, which has a hole bored through it to admit the screw H to pass and revolve freely in it, as indicated by the dotted lines. L is a wheel fixed firmly on the head H′ of the screw, which is made square for that purpose. This wheel is furnished with pins, by which, while the pressure is light, it may be turned by hand. This wheel I sometimes make of a diameter of eight or ten feet, but it may be smaller and be turned by hand-spikes. The cross-timbers I, J, and K have gains or notches in their ends to receive the side pieces G G, and to admit them to slide back and forth. The head H′ of the screw works in a box or head-plate, *c*, and it may be further sustained by a collar fastened to the cross-timber I, and bearing against the back of the wheel L, as shown on an enlarged scale in Fig. 4, where *d d* is such a collar.

From the cross-timber K, or from that marked J, when the third cross-timber K is not used, two pieces of timber, M M, mortised into it, project forward from it, and at their outer ends carry the follower N. The timbers M are of such length as to extend entirely through the false hogshead, and to enter the true hogshead to a distance which will leave a space that may be somewhat greater than is necessary for the insertion of the head after the packing is completed; but it is not required to pass to any considerable distance within. The false hogshead may be of sufficient length to fill the true hogshead at one operation; but this is not necessary, as the false hogshead may be removed and refilled at pleasure, there being but little elasticity in tobacco to cause it to rise when the pressure is taken off from it. The follower N may, if desired, be made to advance by the turning of the screw H in either direction, and this may be desirable when the press is used for cotton or other elastic substances; but for tobacco it is not required. When it is desired to effect this, two additional side pieces, O O, and the cross-timber K are employed, the additional side pieces being received within the cross-timbers outside of the pieces G G. The manner of using them will be presently explained.

The hogshead B, when placed upon the bed or cradle A A of the press, has its bottom or closed head against the end timber, F′, and the false hogshead C is placed against its open head, both having been hand-packed, in the manner already described. The hogshead and false hogshead may be confined on the bed by means of bands *e e* passing around them. There may also be an iron rod, *f f′*, extending along the upper and lower sides of the hogshead B, these being made fast to the head-timber F′ at one end, and the other, *f′*, reaching sufficiently far beyond the open head to admit of a long rod or pin being passed through eyes in them for the purpose of retaining the tobacco when the false hogshead is removed to be refilled. There are notches *g* in the end of the false hogshead for the retaining-rod to enter, and there is also a groove, *h*, across the face of the follower N for the same purpose.

Figure 3:
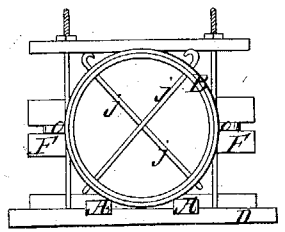

In the section Fig. 3 *j j* are the rods for confining the tobacco, of which there may be one, two, or more, either crossing or placed parallel to each other. *k k* are holes through the hogshead and false hogshead for their insertion. When it is not intended to advance the follower by the turning of the screw in both directions, neither the additional cross-timber K nor the additional side pieces O O are required, and the timbers M M and the follower N are then to be attached to the cross-timber J. To advance the follower, the sliding cross-head I is held in place by bolts *i i*, passed through holes in the side pieces G G, against which it bears, and then by turning the screw H the piece J and the follower will be made to advance, and when this has been done to the extent allowed by the length of the screw, bolts may be passed in behind the sliding timber J, the screw be turned back, and a fresh hold obtained behind the timber I, and so on in succession until the pressure is completed. I am thus enabled by means of a short screw to continue the packing to any required extent, and a much smaller screw may be employed than when one of greater length is required, thus lessening the friction of the screw and the danger of its bending.

The following is the procedure when it is desired to advance the follower by the revolution of the screw in either direction. Bolts or check-pins are to be placed behind the timber K through holes in the additional side pieces O O. Bolts are also to be passed behind the timbers J through suitable holes in the side timbers G G, and in front of the timber I through holes in the additional side pieces O O, and the arrangement will then be complete. It will be seen that under these circumstances the cross-timbers I and K cannot approach each other, and that as the screw is turned back the additional side pieces O O will be made to advance, and to carry with them the timber K, and the follower attached to it.

Tobacco when pressed in the manner resulting from the construction of my press is more equal in its texture, and in better condition in the hogshead than it ordinarily is when pressed in any of the usual modes, as in these the tobacco supplied in separate portions is pressed home at each time of making such supply, while in my press, as the follower enters to but a short distance within the open mouth of the hogshead, the final pressure is not given to any portion of it until the filling of the hogshead is completed. It will not therefore be bruised in the separate layers, as is known to be frequently the case with pressed tobacco driven home at intervals, and by which bruising it is much deteriorated, and its value lessened in the market.

Having thus fully described the nature of my press, what I claim therein as new, and desire to secure by Letters Patent, is—

1. The manner of arranging the side and cross timbers, as described, for the purpose of securing the pressure already gained, and of advancing the follower by the turning of the screw in either direction.

2. The manner of combining the side pieces G G, the cross-timbers I and J, and the follower N with a short screw, H, so as to allow of the employment of such short screw, as set forth.

3. The so constructing of the follower and its appendages, in combination with the false hogshead, as that they shall effect the final packing or driving home of the whole body of the tobacco or contents of the hogshead by the pressure of the last portion supplied by the false hogshead, in the manner set forth.

4. The manner of confining the tobacco both in the hogshead and in the false hogshead by means of the rods used by me for that purpose, as set forth—that is to say, in combination with a press in which the hogshead and false hogshead are operated upon in a horizontal position, in the manner set forth.

ALEXR. J. MURRAY.

Witnesses:

FRED. G. ROGERS,
JAS. H. MURRAY.